(12) United States Patent
Claudatos et al.

(10) Patent No.: US 9,497,205 B1
(45) Date of Patent: *Nov. 15, 2016

(54) GLOBAL COMMONALITY AND NETWORK LOGGING

(75) Inventors: Christopher Hercules Claudatos, San Jose, CA (US); William Dale Andruss, Minneapolis, MN (US); Michael John Dutch, Saratoga, CA (US)

(73) Assignee: EMC Corporation, Hopkinton, MA (US)

(*) Notice: Subject to any disclaimer, the term of this patent is extended or adjusted under 35 U.S.C. 154(b) by 700 days.

This patent is subject to a terminal disclaimer.

(21) Appl. No.: 12/165,612

(22) Filed: Jun. 30, 2008

Related U.S. Application Data

(60) Provisional application No. 61/054,419, filed on May 19, 2008.

(51) Int. Cl.
*H04L 12/00* (2006.01)
*H04L 29/06* (2006.01)

(52) U.S. Cl.
CPC .................. *H04L 63/1425* (2013.01)

(58) Field of Classification Search
CPC .................................................. H04L 63/1425
USPC .................................. 707/999.01, 698, 687
See application file for complete search history.

(56) References Cited

U.S. PATENT DOCUMENTS

| | | | |
|---|---|---|---|
| 5,274,631 A * | 12/1993 | Bhardwaj | 370/401 |
| 5,933,818 A | 8/1999 | Kasravi et al. | |
| 6,026,167 A | 2/2000 | Aziz | |
| 6,370,247 B1 * | 4/2002 | Takaragi et al. | 380/28 |
| 6,522,726 B1 | 2/2003 | Hunt | |
| 6,587,831 B1 | 7/2003 | O'Brien | |
| 6,950,434 B1 | 9/2005 | Viswanath et al. | |
| 6,959,384 B1 * | 10/2005 | Serret-Avila | 713/176 |
| 7,248,680 B1 | 7/2007 | Gainsboro | |
| 7,424,744 B1 | 9/2008 | Wu et al. | |
| 7,443,321 B1 | 10/2008 | Kaufman et al. | |
| 7,457,745 B2 | 11/2008 | Kadambe et al. | |
| 7,600,125 B1 | 10/2009 | Stringham | |
| 7,634,657 B1 * | 12/2009 | Stringham | 713/168 |
| 7,676,688 B1 * | 3/2010 | Hardman | 714/6 |
| 2001/0036821 A1 | 11/2001 | Gainsboro et al. | |
| 2002/0010797 A1 | 1/2002 | Moulton | |
| 2002/0071537 A1 | 6/2002 | Gainsboro | |
| 2003/0012200 A1 | 1/2003 | Salamat | |

(Continued)

*Primary Examiner* — Alexey Shmatov
(74) *Attorney, Agent, or Firm* — Staniford Tomita LLP

(57) ABSTRACT

Data is divided into blocks, a signature is derived for a block, and the signature is stored in a storage device without retaining the block. The signature may be derived with a hash function. A second signature may be derived for a second block, and compared to the first signature. If there is a match, network data for the second block may be associated to the first signature. If there is not a match, the second signature may be stored, and the second block may be discarded. Policies may be applied, including flagging the data for review, preventing transmission of the data, and storing the data. Network data may be stored with the signatures. Data may be analyzed by dividing it into blocks, deriving a signature for a block, and comparing the signature to stored signatures. If there is a match, network data associated with the matched signature may be retrieved. A plurality of blocks may be compared to the stored signatures to determine degree of commonality.

14 Claims, 7 Drawing Sheets

(56) References Cited

U.S. PATENT DOCUMENTS

| | | |
|---|---|---|
| 2004/0064737 A1* | 4/2004 | Milliken et al. ............. 713/201 |
| 2004/0073617 A1* | 4/2004 | Milliken et al. ............. 709/206 |
| 2004/0083299 A1* | 4/2004 | Dietz et al. ................. 709/230 |
| 2005/0022031 A1* | 1/2005 | Goodman et al. ............ 713/201 |
| 2005/0102525 A1* | 5/2005 | Akimoto ............ H04L 63/0236 713/187 |
| 2005/0276385 A1 | 12/2005 | McCormick |
| 2006/0059173 A1 | 3/2006 | Hirsch et al. |
| 2006/0085855 A1 | 4/2006 | Shin et al. |
| 2006/0111904 A1 | 5/2006 | Wasserblat et al. |
| 2006/0115061 A1 | 6/2006 | Wilson et al. |
| 2006/0179141 A1 | 8/2006 | John et al. |
| 2007/0180275 A1 | 8/2007 | Metzger et al. |
| 2007/0220023 A1 | 9/2007 | Dean et al. |
| 2007/0256129 A1* | 11/2007 | Jung et al. ..................... 726/24 |
| 2008/0008302 A1 | 1/2008 | Yim |
| 2008/0134331 A1 | 6/2008 | Sung Won et al. |
| 2008/0205273 A1 | 8/2008 | Wackerly |
| 2009/0268632 A1 | 10/2009 | Pabari et al. |

* cited by examiner

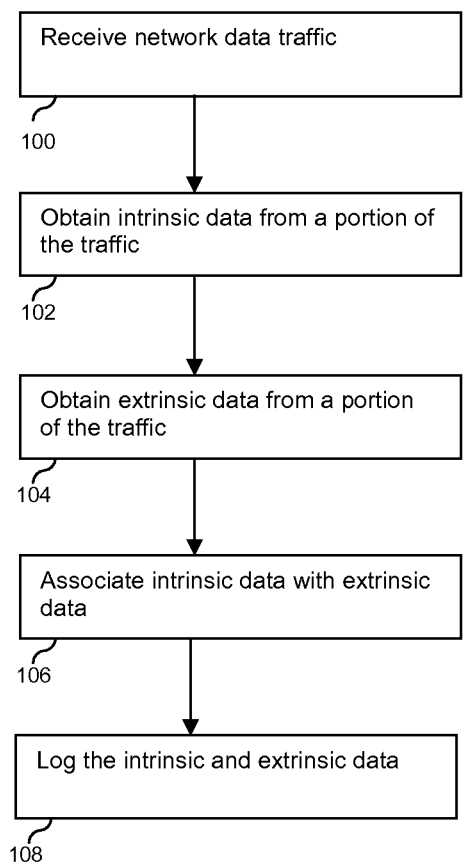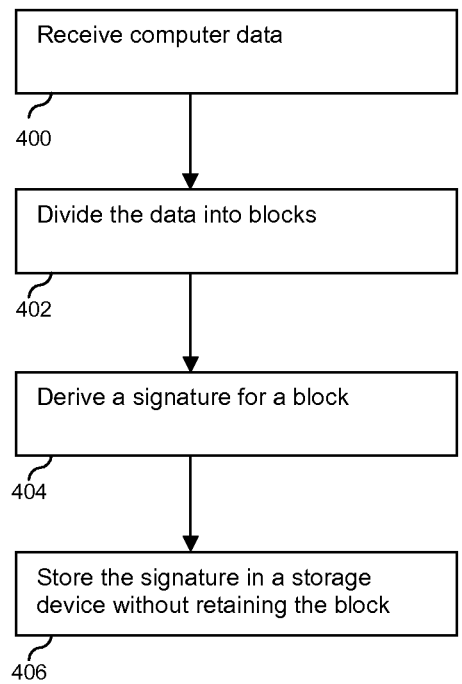
FIG. 4
FIG. 3

GLOBAL COMMONALITY AND NETWORK LOGGING

CROSS REFERENCE TO RELATED APPLICATIONS

This application claims priority to co-pending U.S. patent application Ser. No. 11/648,071 for NETWORK MONITORING filed Dec. 30, 2006, which is incorporated herein by references for all purposes; and to U.S. Provisional Patent Application No. 61/054,419 for GLOBAL COMMONALITY DISCOVERY AND LOGGING filed May 19, 2008, which is incorporated herein by reference for all purposes. This application is related to co-pending U.S. patent application Ser. No. 12/165,610 for GLOBAL COMMONALITY DISCOVERY AND LOGGING and filed concurrently herewith, which is incorporated herein by reference for all purposes; and to co-pending U.S. patent application Ser. No. 12/165,615 for GLOBAL COMMONALITY ANALYSIS and filed concurrently herewith, which is incorporated herein by reference for all purposes.

FIELD OF THE INVENTION

This invention relates generally to discovering data and tracking movement of data, and more particularly to systems and methods for logging and tracking data at various locations and in transit.

BACKGROUND OF THE INVENTION

This invention relates to a system and method for logging and tracking data at various locations and tracking movement of data. Business and legal requirements may require monitoring of network data traffic, which may include data packets flowing across the network. For example, anti-terrorism laws may require an Internet Service Provider (ISP) to maintain logs of all Internet traffic of its customers for a prescribed time period. The goals of such laws are to assist law enforcement agencies to investigate potential terrorist activities, including planning and financing. Other goals may include investigating potential lawbreakers and thwarting child pornographers and other internet predators. Investigations into illicit behavior are often hampered because such log data is routinely deleted in the normal course of business. Furthermore, the value of the current log is limited due to the fact that it contains very basic metadata (data about data) and nothing about the data traffic payload. Corporations may use this data to help them better manage their networks and to identify anomalous or unwanted network traffic. This data, however, is subject to the same limitations as described above.

Storing the entire network traffic is technically feasible, but this approach would come at great cost in terms of storage and archival. In addition, the laws of some countries may prohibit inspection of people's data without court approval or other authorization on a case by case basis. Furthermore, even if the entire traffic data were retained, there is no method to efficiently and effectively search the data. In the US, legislation has been enacted and new legislation is proposed to permit limited surveillance in the form of logging. Such logging may keep the names of an ISP's customers and their IP addresses, the IP addresses of the sites to which they connected, and the dates and times of their connections. Because the goal is investigative, the paucity of data limits the value of the log. For example, if investigators were to have the entire network traffic available for inspection, including the payload, the quality of their data would improve significantly, thus aiding their investigation. However, this is not feasible, due to various laws prohibiting such surveillance. In corporate use, the cost associated with storing all network traffic may not be justifiable.

With the proliferation of computer and communication systems there has been a significant increase in the amount of data within systems. There has also been a tremendous increase in the amount of data copied, moved, or shared between systems. As the adoption of these systems grows, the amount of data handled by and through them also increases. They become more essential to the operation, control, and management of an endless variety of use-cases including but not limited to personal, business, and governmental applications. Because of their greater use and high concentration of data-value they become targets of criminal attack and vehicles for unwanted and unauthorized activities. For example, a system may contain or handle a large amount of financial data. Due to this concentration of data, the system becomes a high-value target for criminal exploitation. Another example is that systems are being operated by criminals, vandals, terrorists, and so on, for the purpose of planning or carrying out their criminal activities such as the trade in child pornography, terrorist planning, illegal gambling, drug trafficking, and so on. Another example is that the systems of unsuspecting victims are being hijacked without authorization through remote means and used as vehicles through which further bad acts can be perpetrated.

Another example is that systems in the workplace are being used for a blend of personal and business reasons. This is a common use-case which most companies explicitly or tacitly approve of Even so, companies are being compelled by legislation to take responsibility for all communications and computer data traffic generated or made by company personnel whether or not such communications are authorized, internal, external, or personal. As an example, stock brokerages must take responsibility for the communications between their traders and their customers. Also, companies must be able to determine if any inappropriate activities are going on within their workplace. This can range from offensive language used in emails between employees to the use of company systems to store and distribute illegal copies of music, video, texts, books, and software.

In addition, there is an added challenge to logging which is the issue of privacy. Most countries have laws which respect and protect the privacy of their citizens. As such, it is typically impossible for law enforcement officials to monitor citizen data without a court order. While this restriction may help protect the privacy of the citizenry, it also blunts the benefits of such logging and investigation. Until now, the challenge has been to find sufficient evidence of wrongdoing so that a search warrant can be justified. The means for producing sufficient evidence would benefit from deep inspection into the content of data objects but this is specifically prohibited without a search warrant.

There is a need, therefore, for an improved method, article of manufacture, and apparatus for monitoring data.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a flowchart illustrating a process for analyzing traffic in some embodiments of the invention;

FIG. 4 is a flowchart illustrating a process for processing data in some embodiments of the invention;

DETAILED DESCRIPTION

Figure 1:
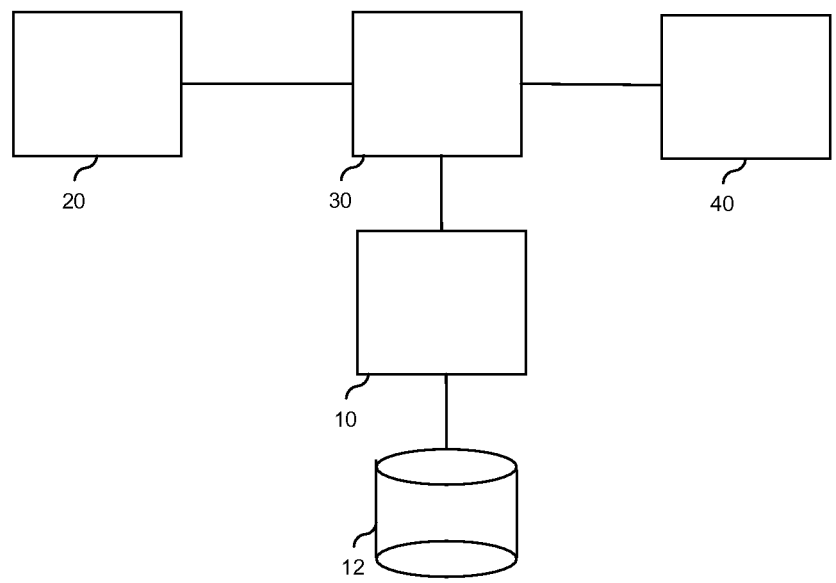
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which a network traffic analysis program executes, but it should be understood that the principles of the invention are not limited to this particular configuration. Rather, they may be applied to any system in which data exists, or in which network traffic is scanned or transmitted, either on a local or remote device, and the system may comprise one or more devices. Although the methods herein are described in terms of their application to Internet network data traffic analysis, one skilled in the art will recognize that they are equally applicable to other cases for which it is desirable to track data, including but not limited to internal corporate networks. For example, clients may be placed on various machines to analyze data and communicate with a server. Disclosed herein are a method and system to log and archive data at various locations and data traffic, such as Internet traffic, in such a manner as to make the log searchable and relevant to various investigations without storing the actual data (content) or necessarily providing the surveilled payload to any parties.

Also disclosed are methods of discovering within single and multiple systems or in transit between systems, the existence of data objects and their location, their transmission and copy history, their genealogy, their chain of custody, and the determination of the similarity of one data object or portions thereof to another, and keeping a record of such information.

Methods may be provided to create and maintain usage logs for logging system and network data. These logs may capture source and destination IP addresses, time, date, protocol used, amount of data sent/received, and possibly account owner information (at least from one side of the communication channel). Such approaches may provide log information about a single site, a single system, or a specified communications channel. In order to discover correlations among data from multiple sites/systems and to identify who or which system had/has a given data object or engaged in a data interaction of a certain protocol (such as VoIP calls), the logs must be aggregated, searched, and analyzed as a post-logging process. Post-logging operations would need to be performed every time new information was added and every time new correlations between data were suspected. These efforts consume time and resources and because they are part of a post-process operation there is no ability to learn of the occurrences and correlations in or near real-time. The use of commonality factoring as disclosed herein provides enhanced functionality.

Figure 2:
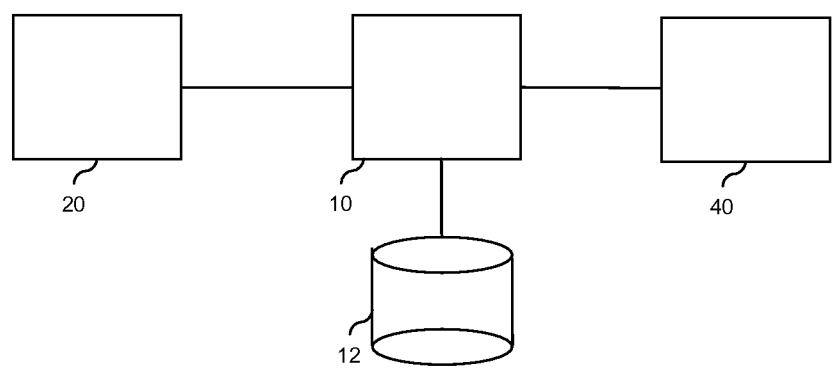
FIG. 2 is a diagram of an embodiment of a system in accordance with the invention.

FIG. 1 illustrates a configuration in which a network traffic monitoring system comprising a network traffic analysis program executing on a computer system 10 could be used to scan network data traffic. As shown in FIG. 1, a network tap 30 may be used, in which a passive data tap is placed in the data path between host 20 and host 40, and all traffic flowing through the tap 30 is visible to the monitoring system 10. Common networking mirroring methods may be used, in which network traffic is essentially "cloned" and the cloned traffic is via a monitoring port to the monitoring system 10 or an IP address for the monitoring system 10. A storage device 12 is provided for storing data from the monitoring system 10. In some embodiments, an active tap may be placed inline with the traffic, thereby acting as a "man-in-the-middle." In this configuration, the active tap may control the flow of traffic as well as monitor all traffic that flows through it. The functionality of the network tap and monitoring system may be combined into one system 10, as shown in FIG. 2. It should be understood that the above methods are presented by way of illustration and are not intended to be limiting. Various methods of monitoring network data traffic may be used, singly or in combination, without departing from the spirit of the invention. For example, other components may be added to the configuration of FIG. 1 to perform functionality of the monitoring system 10. Storage can be provided in a variety of ways, such as through a NAS (network attached storage), a SAN (storage area network), or other configuration.

The network traffic monitoring system 10 may be used to process network traffic as will be described herein. In some embodiments, data may be collected by the monitoring system 10 directly from the network data traffic. This information may be considered "intrinsic" in that the information is extractable from the packets directly (such as by inspection of the packet headers) and is intended to be understood by common network equipment. Some processing may be involved, such as the determination of the packet's beginning and end points, its type (such as TCP or UDP, etc.), and the relevant subset of data within the packet (such as source address). Such intrinsic data may include source address, destination address, source MAC (Media Access Control) address, destination MAC, protocol, route taken, time/date, packet size, bandwidth, physical port number, logical port number, etc.

Data may be determined from examination of the network data traffic payload; e.g., content derived metadata. This information may be considered to be "extrinsic" in that the data has no intended meaning to common network equipment such as switches, routers, network interface cards, etc., and the data may reside in a combination of locations such as the packet header and the payload. Extrinsic data may include information about the following:

Application—indicates the application(s) associated with the network traffic. Examples: Kazaa, Skype, IM, email, file sharing, video conferencing, VoIP, etc. This may be determined by examining the payload and detecting characteristics unique to the application generating the traffic. Various techniques may be used to determine traffic type, such as those used in firewalls and network intrusion detection/protection systems. Some techniques may be based on the association of applications to specific ports or a sequence of ports. Others may use byte pattern matching. Techniques beyond port matching may be used because some applications do not have fixed port associations or they intentionally use ports associated with other applications in order to disguise their identity (such as when traffic is encapsulated over HTTP in order to pass through firewalls). Other techniques may be based on packet length, inter-arrival times, flow characteristics, etc., and combinations of multiple techniques may be used. Some applications may be easily identified if they embed an identifier in their packet header. Thus, various techniques of sniffing traffic may be used to identify traffic such as file transfers and then extract the additional data such as file name, date, etc.

File and object types—are there files or objects being transferred? If so, what file or object types are being used? Examples: document files (.doc, .pdf), image files (.bmp, .gif), multimedia files (.jpeg, .wav, .avi), database objects, data streams, etc.

Event Data—this may be considered a subset or more detailed aspect of Application data. For example, video cameras may also have event triggering capabilities where a data signal is sent based on a physical or video event (such as a door opening or movement within a certain region of the viewed area), or based on alarm signals. Derivation of event data may be performed using similar techniques for deriving application data.

Hash signature—when files or objects are being transferred, create a hash of the file. Various hash algorithms may be used, such as Secure Hash Algorithm or MD5.

Location—render the apparent geophysical location of all parties. This may be performed, for example, by lookup of an IP address's registration. In some embodiments, the lookup can be combined with (or compared to) the subscriber's address on file with the ISP.

Encryption—determine if the traffic is encrypted or otherwise unknown/unknowable. Encrypted traffic may be identified by the use of an encrypted traffic protocol such as HTTPS. Some traffic may not "self-identify" as encrypted, and various techniques may be used to identify such traffic. In some embodiments, the entropy of the traffic's payload is measured to determine whether it is encrypted, and may need to be distinguished from other high entropy data types such as image files, compressed files, etc.

Identity—determine whether identity information is contained within the payload. In some embodiments, a speaker recognition system may be used to examine voice data traffic (or other audio elements within other formats such as audio files, video files, etc.) to determine the identity of the speakers. Such identification may be permissible because the identity of the users is given. In some embodiments, a facial recognition system may be used with video or image traffic to determine the identities of people depicted. In some embodiments, object recognition may be used with video or other image formats in order to determine what objects are depicted, such as structures that might be considered high-profile targets.

Language—analyze text and audio elements to determine which languages are being used in the traffic. This may be done by attempting to match portions of the traffic to text and audio elements in lexicons for various languages.

Phonic Profile—determine if the traffic contains any of many types of sounds such as blasts, gunshots, crying, laughing, glass breaking, etc. This may be done by using an auditory recognition system to analyze the traffic.

Locale—determine the locale depicted in traffic containing images by applying image recognition systems against the traffic.

Word Spotting—determine if specific words were spoken by applying a word spotting system against the traffic.

FIG. 3 illustrates a process flow in some embodiments. As shown, the process includes receiving network data traffic in step 100. Intrinsic data is obtained from a portion of the data traffic, step 102, such as by inspection of packet headers in the portion examined. Extrinsic data is obtained from a portion of the data traffic, step 104, by analyzing its payload. In some embodiments, the extrinsic data may be obtained from the same portion of data traffic from which the intrinsic data is obtained, though it may be useful in some cases to obtain intrinsic and extrinsic data from different portions of the traffic. In step 106, the intrinsic data is associated with the extrinsic data, and the intrinsic data and extrinsic data are logged, step 108.

The extrinsic data derived from examination of the network data traffic payload or from clients at various systems may be analyzed using commonality factoring, a well-known technique used for de-duplicating data to reduce storage requirements. Multiple methods may be used to achieve these results. Generally, these methods split data objects into smaller blocks of data with either fixed or variable lengths. These blocks are then rendered through a hash function (such as a cryptographic hash algorithm) into unique numerical sequences ("hashes") which represent each unique block. Because the hash function deterministically renders identical blocks with the same hash, it is possible to determine if blocks are identical or different simply by comparing the hashes. If the hashes match, they are identical. If the hashes do not match, the blocks are different. Hash mismatches provide no further information other than that the blocks are different. They do not, for example, communicate the degree of difference or where within the block the differences occur.

Commonality factoring may be performed at the source of the data or at the data's destination. In the case of storing data for backup purposes, the workflow can first require the source data to be backed up to the backup destination. The data may be reduced through commonality factoring once it is at the backup destination. If commonality factoring is applied at the source, duplicate data may be identified before transmission to the backup target. This eliminates the need to transmit duplicate backup data to the backup target, thus saving bandwidth and time.

Commonality factoring may involve several components: the source data, the various blocks of data which comprise the source data (repository of source blocks), the hashes that uniquely identify the blocks, the collection of pointers to the hashes which collectively represent the source data in its original form, the index of the hashes, and metadata which describes other aspects of the original source data such as the filename, timestamp, pathname, file owner, etc.

As more data is processed through the commonality factoring engine, the existence of duplicate blocks of data is identified. Through this identification it is possible to achieve significant reductions in the amount of bandwidth required for data transmission and the amount of storage space for storing the data.

The commonality factoring process creates a rendition of the original data that is unreadable and incomprehensible to humans unless each hash within the sequence of hashes that represents the file (or object) is associated with its respective source block of data. Through this association, the data may be restored or reconstituted to its original state. If the hashes are separated from and no longer associated to the repository of source blocks, the source data object will remain unknowable from the hashes. This means that there is no way to know the contents of or reconstruct the original data object without the source data blocks.

These approaches are useful for reducing the amount of data stored and transmitted by eliminating redundant data at the file level and the sub-file level. These methods work with data within a single system or across multiple systems. In other words, data that is found to be redundant when compared to all the data contained at its own source can be eliminated as well as data which is found to be redundant when compared to all the data from all other systems within the affected domain. For example, if a single computer contains hundreds of identical data objects ("Block-A") then only one copy of Block-A needs to be transmitted and stored. In another example, if multiple computers each contain one or more of Block-A then only one copy of Block-A needs to be transmitted and stored. In this case even greater efficiency is achieved.

Commonality factoring may be used to identify commonality of sub-data-object elements and applied to data logging. As data traffic is sent and received through a network, data logs may be generated. Commonality factoring is applied to the network data. Network data streams may be divided into blocks that are hashed and stored as described herein. The complete data stream may be captured and stored, or a portion or even none of the data stream may be captured and stored. The data stream may be permitted to continue to its intended destination, stopped from reaching its intended destination, diverted from reaching its intended destination, cloned (a copy of the data stream is sent to a destination other than the intended destination), or some combination of these, as described herein. In some embodiments, the data stream may not be retained, but simply analyzed and allowed to continue to its intended destination. Blocks may be discarded (i.e., they are not kept by the monitoring system, though they may be allowed to continue to their destination on the network). In some embodiments, policies may be applied to restrict the data stream based on some data in the stream, which may be determined by matching hashes. For example, if a file is known to be contraband (such as child pornography or a confidential or classified document), and has been rendered into blocks with signatures for each, a data stream could be intercepted/blocked based on matching at least some of the prohibited hashes to hashes from the data stream. The matching of prohibited hashes may be flagged for review by another party, such as law enforcement or an administrator.

In some embodiments, identical blocks are not stored again but instead, pointers to the redundant blocks may be maintained together with necessary metadata that permits proper reconstitution of the reduced data. In some embodiments, identical hashes of blocks are not stored again, but instead, pointers to existing hashes may be maintained, and associated with necessary metadata, such as intrinsic data from the network traffic. Information regarding sequencing of blocks may be stored, or implicit in the timestamps. These methods may be applied to all traffic where network logging is required. Since commonality factoring may be applied across multiple sources (including non-transitory sources such as data storage), the same holds true here and network streams from a plurality of sources and destinations, as well as data from repositories, may be logged and/or stored.

The following figures are illustrative of some embodiments described herein. FIG. 4 is a flowchart illustrating an embodiment of a process for processing computer data. In step 400, computer data is received. The data is then divided into blocks, step 402. A signature is then derived for each block, step 404. The signatures are then stored in a storage device without retaining the block, step 406.

Figure 5:
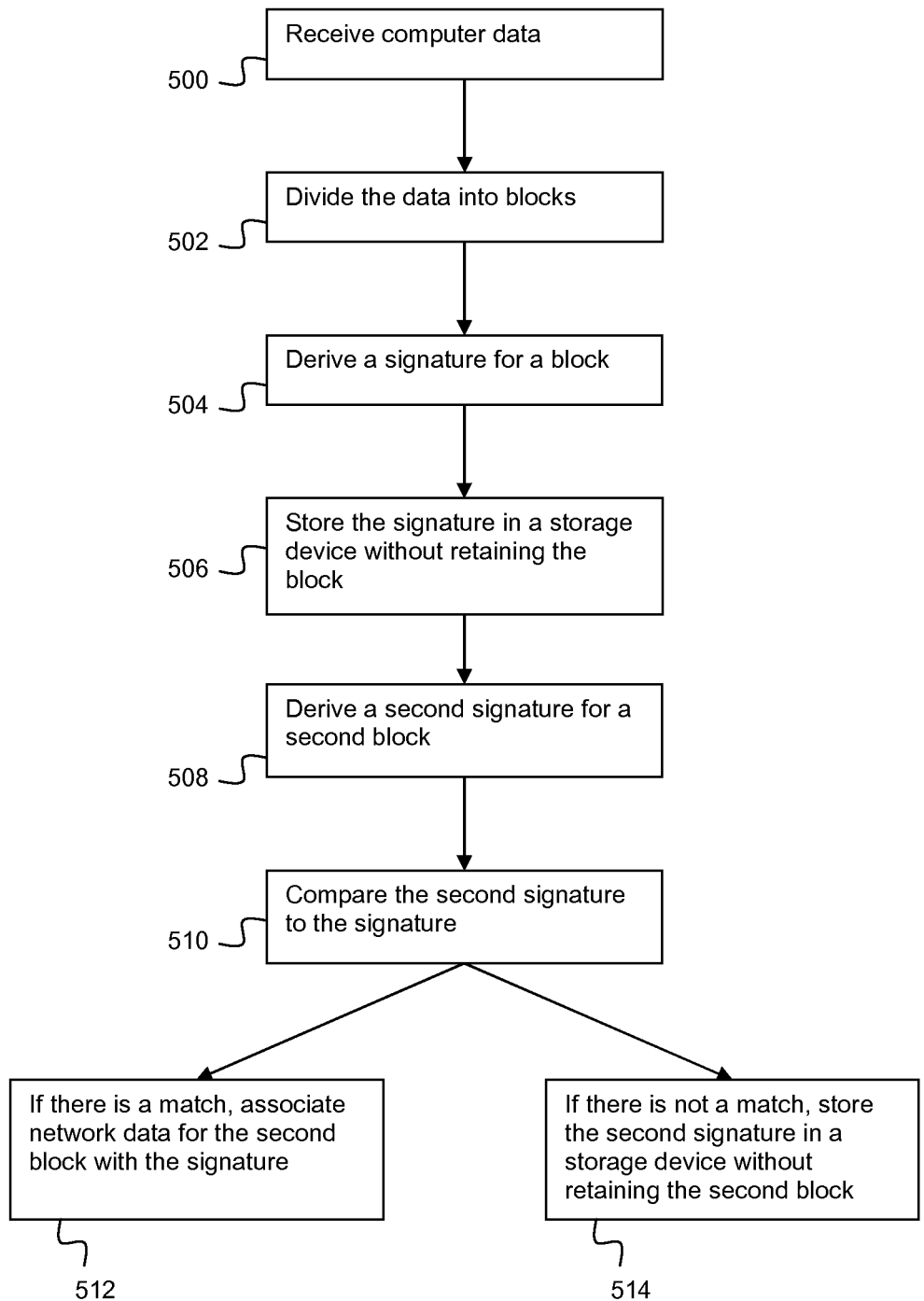
FIG. 5 is a flowchart illustrating a process for processing data in some embodiments of the invention.

FIG. 5 is a flowchart illustrating an embodiment of a process for processing computer data. In step 500, computer data is received. The data is then divided into blocks, step 502. A signature is then derived for each block, step 504. The signatures are then stored in a storage device without retaining the block, step 506. A second signature is derived for a second block, step 508. The two signatures are then compared to each other, step 510. If the signatures match, network data for the second block is associated with the signature, step 512. If the signatures do not match, the second signature is stored in a storage device without retaining the second block, step 514.

Figure 6:
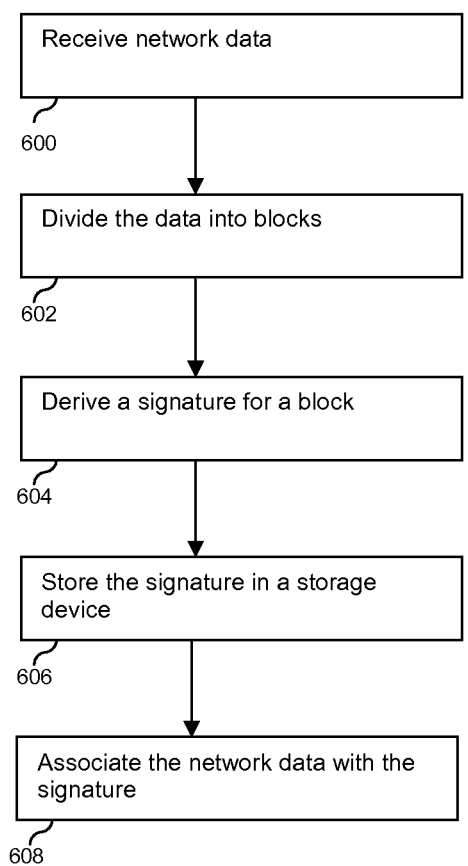
FIG. 6 is a flowchart illustrating a process for processing network data in some embodiments of the invention.

FIG. 6 is a flowchart illustrating an embodiment of a process for processing network data. In step 600, network data is received. The data is then divided into blocks, step 602. A signature is then derived for each block, step 604. The signatures are then stored in a storage device, step 606. The network data is then associated with the signature, step 608.

Figure 7:
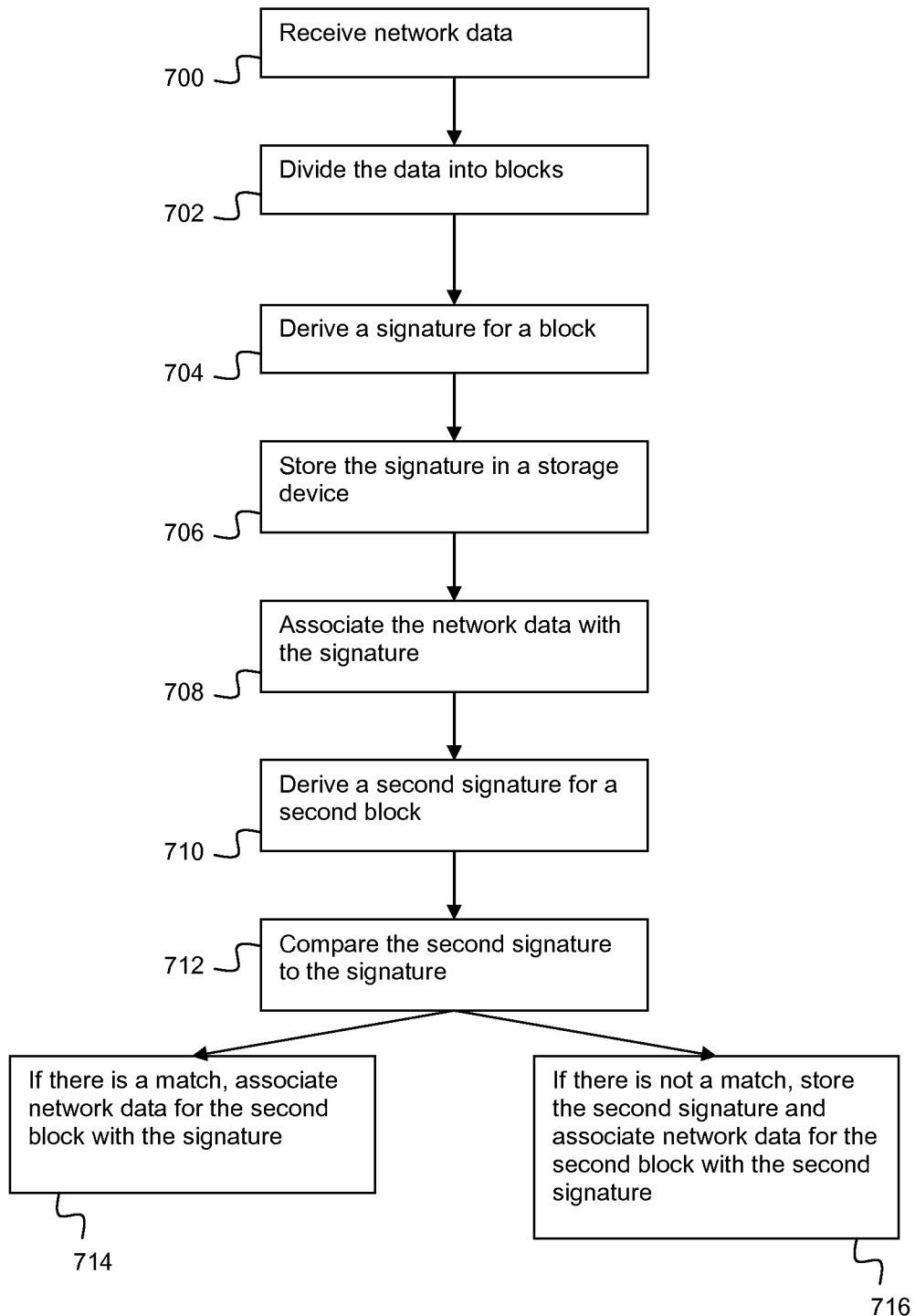
FIG. 7 is a flowchart illustrating a process for processing network data in some embodiments of the invention.

FIG. 7 is a flowchart illustrating an embodiment of a process for processing network data. In step 700, network data is received. The data is then divided into blocks, step 702. A signature is then derived for each block, step 704. The signatures are then stored in a storage device, step 706. The network data is then associated with the signature, step 708. A second signature is derived for a second block, step 710. The two signatures are then compared to each other, step 712. If the signatures match, network data for the second block is associated with the signature, step 714. If the signatures do not match, the second signature is stored, and network data for the second block is associated with the second signature, step 716.

Figure 8:
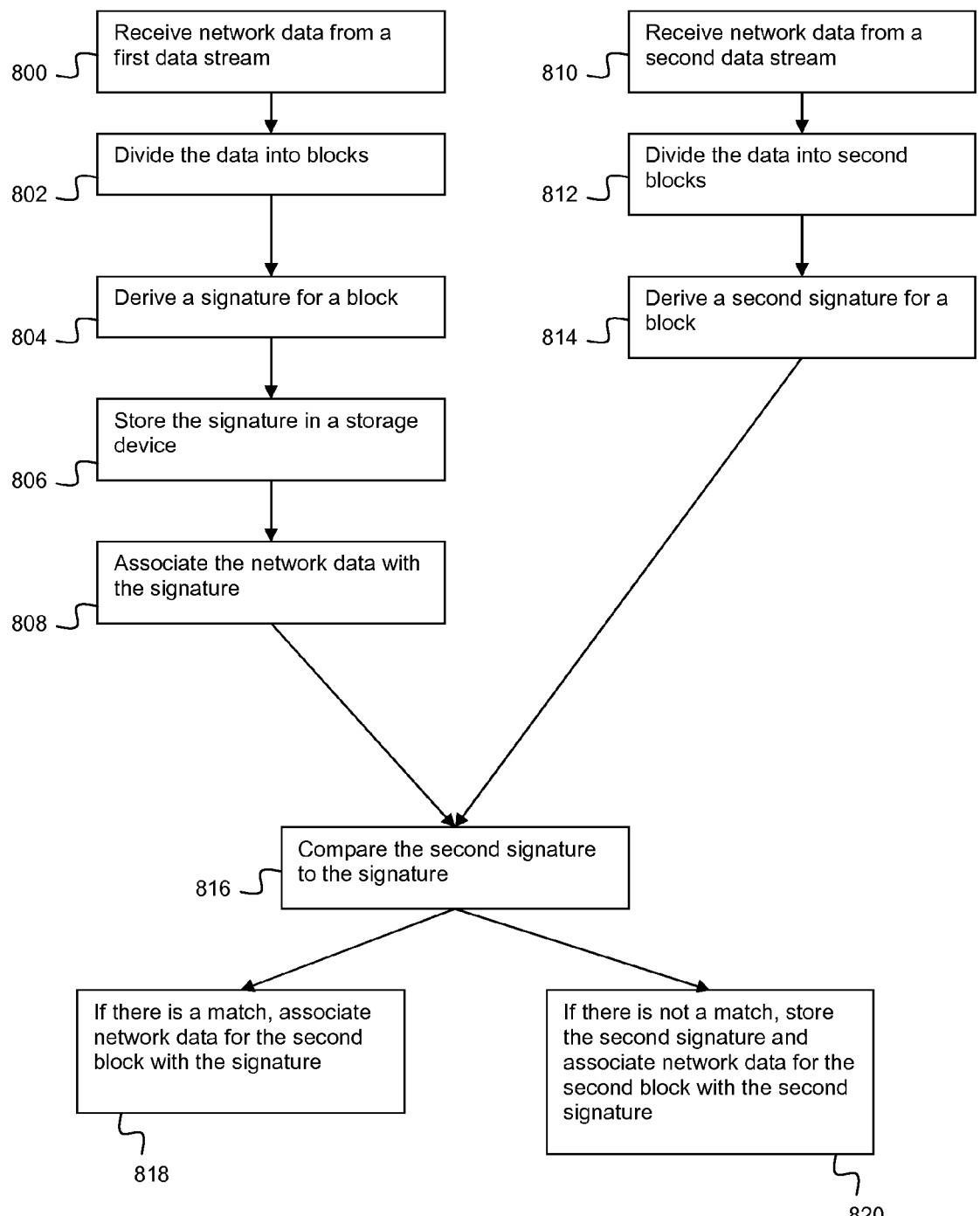
FIG. 8 is a flowchart illustrating a process for processing network data from two data streams in some embodiments of the invention.

FIG. 8 is a flowchart illustrating an embodiment of a process for processing network data from two data streams. In step 800, network data is received from data stream 1. The data is then divided into blocks, step 802. A signature is then derived for each block, step 804. The signatures are then stored in a storage device, step 806. The network data is then associated with the signature, step 808. Network data is received from data stream 2, step 810. The network data from data stream 2 is then divided into second blocks, step 812. A second signature is then derived for each second block, step 814. The signatures from the two data streams are then compared, step 816. If the signatures match, network data for the second block is associated with the signature, step 818. If the signatures do not match, the second signature is stored, and network data for the second block is associated with the second signature, step 820.

By retaining this information in this manner, it is possible to find stored data objects that have multiple references back to a plurality of sources. For example, a file is transferred from Alice to Bob. During the transfer, through commonality factoring, the file is segmented into blocks, the blocks are processed (such as by hashing), and the unique block signatures are stored in nonvolatile storage such as a storage device. Additional metadata (such as extrinsic data) and pointers for the other non-unique block signatures may be associated with the signatures, and may be stored together with the signatures or in a separate storage. A bit later, Bob transfers the same file to Chuck. During this transfer the same commonality factoring process occurs. Now, one copy of the file has been logged but it has three references to it. If we were to start with the same file as Alice and Bob and render it according to the methods of commonality factoring it would be possible to discover: 1) that others have a copy of this file, and 2) who has the other copy(ies) of the file.

This method would provide immediate visibility as to who holds a copy of the data without the need to search the data. This approach provides tremendous benefits because with one search of the database, it is possible to find every instance of a file or object within a vast network.

For the purposes of logging, the value of commonality factoring is its ability to create the database of file and sub-file data objects and their hashes and through this structure find the sources/owners of the data. This usage may be contrasted with the usage of commonality factoring for data reduction for storage and data transmission. In those use-cases, the primary objective is to store (or transmit) the data in a space or bandwidth reduced manner and then be able to reconstitute the data object to its original state. As applied to logging, commonality factoring is used to create a database of objects and from these objects, identify and/or locate the source of the data. Thus, given a data object it is possible to find its source.

Because both the source and the target of a network or data transmission are known, the metadata related to a processed data stream could preserve a record of both. In this manner, even if the receiver does not subsequently send the file, this "touch point" could be captured as well. This enables the discovery of all parties related to the data stream.

To find all identical data objects and their respective owners (point of origination), the system could simply search the database of commonality factored objects and locate their sources.

The methods described herein also facilitate searching for data objects that are not identical but similar. Such similarity may be defined by adjusting various search parameters. In the case of finding the owners (or source) of a specific file, the commonality factoring database could be searched for all references to the file's signature (which could be a hash, composite hash, or a sequence of hashes). The commonality factoring database could also be searched for sources of files (here "files" refers to any type of data object or set) that contain a high degree of overlap of content with a specified file. In some embodiments, a sample file may be rendered through the commonality factoring method. Its constituent hashes may used as the search terms for a search within the commonality factoring database. The results of the search may include all files that contain a 100% match of all the hashes, or may include all files with lesser degrees of hash matches. By adjusting the degree of hash matches, it is possible to adjust the degree of similarity of files reported.

Generally, the greater the degree of similarity demanded the fewer matches that will be reported. Likewise, by specifying lesser similarity, more matches will be reported.

The number of hash matches is one way to define similarity. Another way of defining similarity is to search for hash matches that occur in a particular order within the source file or data object. Given search term hashes of "A," "B," and "C" a search is performed where only matches which contain "ABC" in that specific order are returned. Other files which contain the search terms "A," "B," and "C" but in varying orders will not be returned. For example, if "A," "B," and "C" are the search terms and the search term order is "ABC" then files with the search term order "ACB," "BAC," "BCA," "CBA", and "CAB" will not be returned even though they too contain the desired search terms. In some embodiments, the search term order can be specified so that the order is ignored, and the presence of the search term hashes within a data object would be sufficient to return a hit.

In some embodiments, similarity may be defined by hash matches that occur within a specified proximity to one another within the source file or data object. Given search term hashes of "A," "B," and "C" a search may be performed where only matches that contain the search terms within a specified number of blocks from each other. The number of blocks may be specified as a range or as an explicit number.

In the example given, the default inter-hash distance was zero, meaning that the searched for hashes are to appear contiguously. By specifying a range it is possible to include or exclude exact matches. In some embodiments, proximity of the hashes may be combined with the order of the hashes for further refinement. In this case, not only would the order of the hashes have to match but the hashes would also need to have an inter-hash distance that conforms to the search parameters.

In some embodiments, similarity may be defined by hash matches that occur where specific hashes are located in a specified position within the data object. Because each data object is rendered as a series of hashes in a specified order, a search may be made to find data objects which contain specified hashes at particular positions within the data object. This is similar to the previous search term order method but differs in that the order of the hashes is not the overriding determining factor for a match but rather it is the alignment of the position of the hash within the data object to the search criteria.

This method may be combined with the other two methods (search term order, and search term priority) to create more refined searches. Priority of terms could be specified which would then provide the opportunity for different search results. For example, search term order would run first, then search term proximity, and finally search term position. If the order of these were varied, it is possible that different results would be returned.

In addition to discovery of similar and exact matches of data objects and files, it is possible to discover all files and data objects sent or received by a specific person or system. An intrinsic attribute of the hash database is the possessor/holder (here "possessor" or "holder" do not refer to property ownership of the data but to control or possession of the data) of the data object. This starts at the atomic level where there are references to the file level and finally references to the data holder. By searching the hash database for all data objects which refer to a specific owner it is possible to locate all files and other data objects which share the same owner.

The owner can be identified as a person/user or a system. Search for data ownership may be combined with the search for similarity and all of its variants. Through this combination it is possible to find the owners of data with high degrees of similarity or dissimilarity. This might, for example, be used to search for possible plagiarism.

In some embodiments, it may be desirable to identify files or data objects having sharing the highest degree of similarity. If each file is viewed as being made up of a number of data blocks, and each of these data blocks is viewed as an atomic element, then it would be possible to find all the other files which consist, in part, of the same atomic element. Since each atomic element has a reference to one or more higher-level files then it is possible to reference files according to their atomic element commonality. This may be contrasted with searching for files which contain like or similar data objects as described above in that the search does not begin with a reference file or data object.

In the case of searching for files which contain like or similar data objects, the starting point is a file or data object and the search uses the hashes from the starting file or data object as search terms for the search. With these hashes, files or data objects which contain some or all of these hashes are returned.

In the case of finding files or data objects that share the highest degree of similarity we are not starting with a file or data object as the reference point from which search-term hashes are derived. Instead, we are starting with the repository of atomic data elements. Based on the number of files or data objects referenced to each atomic data element it can be determined which files or data objects have the most commonality or similarity.

The system may determine which atomic elements have the most references from files/data objects. The system may also determine which atomic elements have the most references from files/data objects in common (i.e. Atomic-Data-Element-1 (ADE-1) has references from File-10, File-20, and File-30. ADE-2 also has references to File-10, File-20, and File-30 therefore ADE-1 and ADE-2 have a 100% match of file references).

In some embodiments, network traffic in its entirety (including payload) may be recorded and archived based on content derived data. A policy engine may be used to store and implement policies that direct the network traffic analysis system to take (or refrain from) certain actions. For example, if the traffic is encrypted, a policy could be used to trigger recording of the entire traffic. This may be legally allowable because the traffic's content is not viewable to anyone without the decryption key. This key may be stored in a location apart from the stored traffic, such as for legal reasons. The key storage location may be one not under direct control of investigative or law enforcement agencies, so that a court order or authorization (which could require probable cause or a reasonable suspicion) would be required to view the stored traffic.

There may be value in keeping this traffic for forensic purposes, and it may serve as evidence. At the most basic level, portions of the traffic may have been rendered as a file on the user's computer. Also, based on other evidence and cause, the monitoring agency may obtain legal permission to view the user's private data. In such cases, it may be possible to compel the key holder (which could be the user or a third party such as a service provider; e.g., Yahoo Instant Messenger) to provide the key in order to decrypt the recorded data traffic. This could then be compared to the file on the user's computer.

Figure 9:
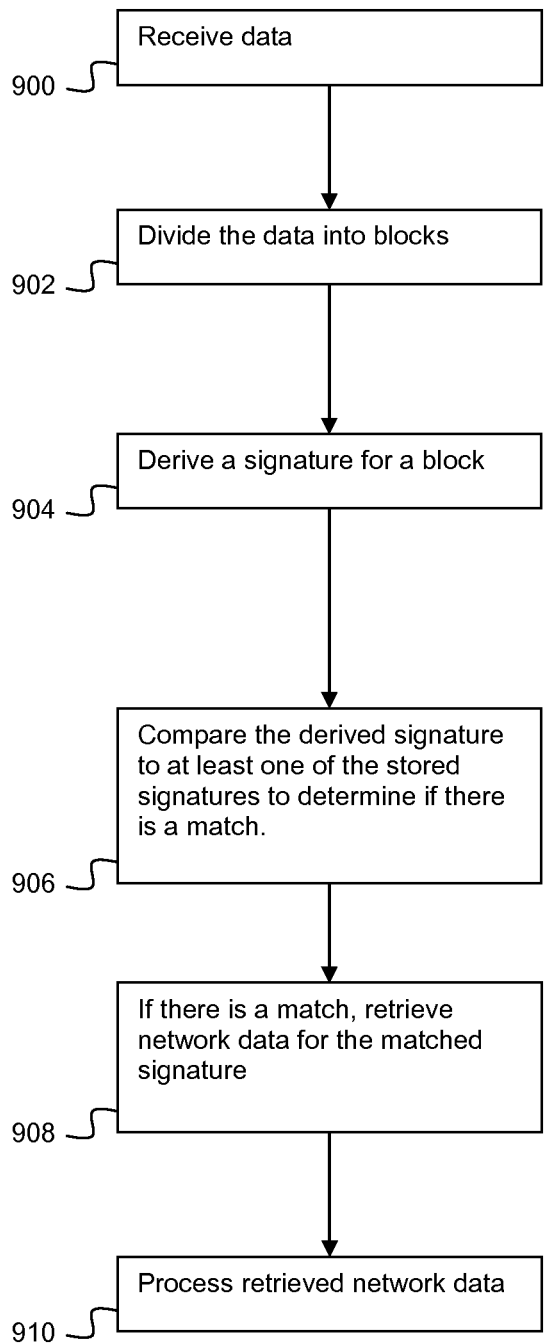
FIG. 9 is a flowchart illustrating a process for analyzing data in some embodiments of the invention.

FIG. 9 is a flowchart illustrating an embodiment of a process for analyzing data in a system having stored signatures derived from blocks of data and network data associated with the signatures. In step 900, data is received. The data is then divided into blocks, step 902. A signature is then derived for each block, step 904. The derived signature is then compared to at least one of the stored signatures to determine if there is a match, step 906. If there is a match, network data for the matched signature is retrieved, step 908. The network data for the matched signature is then processed, step 910.

Various methods and formats may be used for logging data derived from the network traffic and identified at various locations. In some embodiments, the log may include a database. The database may be used to contain records where each record could contain the traffic file itself (such as a .cap, .pcap file, etc.) and all the relevant data (such as hashes) as well as additional data derived and/or extracted from the traffic itself so that the record can be easily searched. In some embodiments, a less structured approach may be used, with a plurality of files or objects associated by a naming scheme or other methods of organization. The goal would be to be able to search through the logs and identify and correlate all the relevant elements.

Thus, in some embodiments, the system has the ability to capture data in a manner that informs an observer of the characteristics of the data without revealing the specific content of the data or the explicit identity of the communicators but retains investigative value. Sniffer files or other such log files may simply be raw traffic presented in per-packet fashion and when possible with known protocol and payload fields decoded. Sniffer files might contain the exact content of the communication, which could be problematic from a privacy standpoint. Keeping these might violate the privacy of the originator and therefore not be permitted as a logging scheme. On the other hand, investigators are allowed to know the identity of the ISP customer and can presumably identify the identity of the remote parties in multiparty communications. The allowed information is not anonymous but it is thus limited due to the need to preserve the identity of the parties. Some approaches may classify and search for traffic that would be of interest to an investigator, to provide information such as descriptions of the types of communications, the types of data being communicated, the anonymous characteristics of participants in a communication, the possible location of the participants, and the specific identity of specific data files and objects without necessarily disclosing the content of the file or object at all. Information such as hash of the files/objects, location information, speaker identity templates, etc. could be retained.

For example, by having the hash of a particular file or a constituent hash for a block deemed "interesting", investigators can use this hash to trace/track its movement and sharing. Music files or porn files could be identified as having come from one person and then transmitted to another and then to another and so on. At some point the investigator may obtain permission to inspect a subject's computer, take an inventory of files and data objects, and generate their hashes. This inventory can be compared to the database/log of traffic created by the network traffic monitoring system. If there is a match between the hashes one would then know the transmission path (chain of custody) and the timeline of custody of the files/objects. The use of the system with hash values and other data in anonymous form facilitates this while complying with privacy requirements.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for logging network traffic, the method comprising:
    storing a policy specifying triggering a recording of traffic if the traffic is encrypted;
    receiving a network data stream comprising network packets, the network packets containing packet headers and payloads, at a network monitoring system situated in a data path between a first host and a second host, wherein the network monitoring system is in communication with a non-transitory storage device;
    extracting, at the network monitoring system, intrinsic data comprising network information from a packet header of a network packet;
    extracting, at the network monitoring system, extrinsic data from a payload of the network packet;
    dividing the extrinsic data into a plurality of data blocks;
    generating a hash signature for individuals of the plurality of data blocks;
    determining whether a log on the non-transitory storage device contains an identical copy of the hash signature;
    associating the intrinsic data with the identical copy when the identical copy exists in the log;
    adding the hash signature to the log and associating the hash signature with the intrinsic data when the identical copy does not exist in the log;
    determining according to the policy whether the network packet is encrypted or not encrypted; and
    if the network packet is encrypted, triggering according to the policy a recording of traffic comprising the encrypted network packet, wherein the recorded traffic comprises encrypted content of the traffic, and wherein a decryption key to decrypt the encrypted content is stored in a location apart from the encrypted content and by a third party.

2. The method of claim 1, further comprising:
    receiving a data object apart from the network data stream;
    dividing the data object into a plurality of object data blocks;
    generating an object hash signature for individuals of the object data blocks;
    determining whether the log contains a matching hash signature for the object hash signature; and
    returning intrinsic information associated with the matching hash signature when the log contains the matching hash signature.

3. The method of claim 1, further comprising determining if the hash signature is derived from a contraband data object.

4. The method of claim 3, further comprising blocking the network data stream from reaching the second host when the hash signature is derived from a contraband data object.

5. The method of claim 1 wherein when the encrypted network packet is recorded at the network traffic monitoring system, the network traffic monitoring system does not have access to a key that decrypts the encrypted network packet.

6. The method of claim 1 wherein the third party comprises the user or a service provider.

7. A non-transitory computer readable storage medium comprising program instructions for logging network traffic, the instructions comprising:
    receiving a network data stream comprising network packets, the network packets containing packet headers and payloads, at a network monitoring system situated in a data path between a first host and a second host, wherein the network monitoring system is in communication with a non-transitory storage device;
    extracting, at the network monitoring system, intrinsic data comprising network information from a packet header of a network packet;
    identifying an application program associated with the network packet;
    extracting, at the network monitoring system, extrinsic data from a payload of the network packet;
    dividing the extrinsic data into a plurality of data blocks;
    generating a hash signature for individuals of the plurality of data blocks;
    determining whether a log on the non-transitory storage device contains an identical copy of the hash signature;
    associating the intrinsic data with the identical copy when the identical copy exists in the log;
    adding the hash signature to the log and associating the hash signature with the intrinsic data when the identical copy does not exist in the log;
    discarding the blocks from the network traffic monitoring system; and
    if the network packet is encrypted, triggering a recording of traffic comprising the encrypted network traffic, wherein the recorded traffic comprises encrypted content of the traffic, and wherein a decryption key to decrypt the encrypted content is stored in a location apart from the encrypted content and by a third party.

8. The program instructions of claim 5, further comprising:
    receiving a data object apart from the network data stream;
    dividing the data object into a plurality of object data blocks;

generating an object hash signature for individuals of the object data blocks;

determining whether the log contains a matching hash signature for the object hash signature; and returning intrinsic information associated with the matching hash signature when the log contains the matching hash signature.

9. The program instructions of claim 7, further comprising determining if the hash signature is derived from a contraband data object.

10. The program instructions of claim 9, further comprising blocking the network data stream from reaching the second host when the hash signature is derived from a contraband data object.

11. A network monitoring system for logging network traffic, the network monitoring system comprising a computer readable storage medium and a processor configured to:

store a policy specifying triggering a recording of traffic if the traffic is encrypted;

receive a network data stream comprising network packets, the network packets containing packet headers and payloads, at the network monitoring system, wherein the network monitoring system is in communication with a non-transitory storage device and situated in a data path between a first host and a second host;

extract, at the network monitoring system, intrinsic data comprising network information from a packet header of a network packet;

identify an application program associated with the network packet;

after extract, at the network monitoring system, extrinsic data from a payload of the network packet;

divide the extrinsic data into a plurality of data blocks;

generate a hash signature for individuals of the plurality of data blocks;

determine whether a log on the non-transitory storage device contains an identical copy of the hash signature;

associate the intrinsic data with the identical copy when the identical copy exists in the log;

add the hash signature to the log and associate the hash signature with the intrinsic data when the identical copy does not exist in the log;

determine whether the network packet is encrypted or not encrypted;

if the network packet is encrypted, triggering according to the policy a recording of traffic comprising the encrypted network packet at the network monitoring system, wherein the recorded traffic at the network monitoring system comprises encrypted content of the traffic, and wherein a decryption key to decrypt the encrypted content stored at the network monitoring system is stored at a location apart from the encrypted content.

12. The system of claim 11, the processor further configured to:

receive a data object apart from the network data stream;

divide the data object into a plurality of object data blocks;

generate an object hash signature for individuals of the object data blocks;

determine whether the log contains a matching hash signature for the object hash signature; and return intrinsic information associated with the matching hash signature when the log contains the matching hash signature.

13. The system of claim 11, the processor further configured to determine if the hash signature is derived from a contraband data object.

14. The system of claim 13, the processor further configured to block the network data stream from reaching the second host when the hash signature is derived from a contraband data object.

* * * * *